(12) United States Patent
Du et al.

(10) Patent No.: US 12,185,711 B2
(45) Date of Patent: Jan. 7, 2025

(54) SMART INSECT COLLECTION DEVICE

(71) Applicants: ORINNO TECHNOLOGY PTE. LTD., Singapore (SG); NATIONAL ENVIRONMENT AGENCY, Singapore (SG)

(72) Inventors: Yu Du, Singapore (SG); Lu Deng, Singapore (SG)

(73) Assignees: National Environment Agency (SG); Orinno Technology Pte. Ltd. (SG)

( * ) Notice: Subject to any disclaimer, the term of this patent is extended or adjusted under 35 U.S.C. 154(b) by 0 days.

(21) Appl. No.: 18/519,924

(22) Filed: Nov. 27, 2023

(65) Prior Publication Data

US 2024/0090490 A1    Mar. 21, 2024

Related U.S. Application Data

(63) Continuation-in-part of application No. 17/257,376, filed as application No. PCT/SG2019/050331 on Jul. 3, 2019, now Pat. No. 11,867,867.

(30) Foreign Application Priority Data

Jul. 3, 2018    (SG) ........................... 10201805751U

(51) Int. Cl.
  *G01V 8/20*    (2006.01)
  *A01M 1/08*    (2006.01)
  (Continued)

(52) U.S. Cl.
  CPC ................. *A01M 1/08* (2013.01); *G01V 8/10* (2013.01); *G02B 3/0037* (2013.01)

(58) Field of Classification Search
  CPC ........ G01V 8/10; G01V 8/20; G02B 19/0009; G02B 19/0085; G01N 21/64
  See application file for complete search history.

(56) References Cited

U.S. PATENT DOCUMENTS 9,410,888 B2    8/2016 Jayasooriya
11,867,867 B2 *  1/2024 Du ........................... G01V 8/20

FOREIGN PATENT DOCUMENTS

CN    108051823 A    5/2018
DE    102004015197 A1    2/2005
(Continued)

OTHER PUBLICATIONS

Potamitis et al., Automated Remote Insect Surveillance at a Global Scale and the Internet of Things. Robotics, Aug. 22, 2017, vol. 6, No. 3, pp. 1-14.

(Continued)

*Primary Examiner* — Kevin K Pyo
(74) *Attorney, Agent, or Firm* — Cesari and McKenna, LLP; Steven M. Mills

(57) ABSTRACT

A smart insect collection device comprising: a trapping device; a sensing device having a through opening in fluid connection with the trapping device; a processing unit to receive electrical signals from the sensing device; and a collecting module comprising: a selection plate having at least one through hole configured to engage an opening of a collection container for collection of insects therein, the sensing device provided between the trapping device and the selection plate, the selection plate movable between at least one non-collecting position and at least one collecting position; and a controller in communication with the processing unit and with a motor provided to move the selection plate, the controller programmable to activate the motor to move the selection plate to the collecting position in response to the processing unit identifying an insect passing through the through opening to be an insect of a predetermined kind for collection.

13 Claims, 20 Drawing Sheets

(51) Int. Cl.
G01V 8/10 (2006.01)
G02B 3/00 (2006.01)

(56) References Cited

FOREIGN PATENT DOCUMENTS

| WO | 2012054397 A1 | 4/2012 |
| WO | 2013017860 A1 | 2/2013 |
| WO | 2015126855 A1 | 8/2015 |
| WO | 2015160958 A1 | 10/2015 |

OTHER PUBLICATIONS

International Search Report and Written Opinion for corresponding International Application No. PT/SG2019/050331, mailed on Sep. 25, 2019.
Second Written Opinion for corresponding International Application No. PT/SG2019/050331, mailed on Jul. 23, 2020.
International Preliminary Report on Patentability for corresponding International Application No. PT/SG2019/050331, completed on Oct. 2, 2020.

* cited by examiner

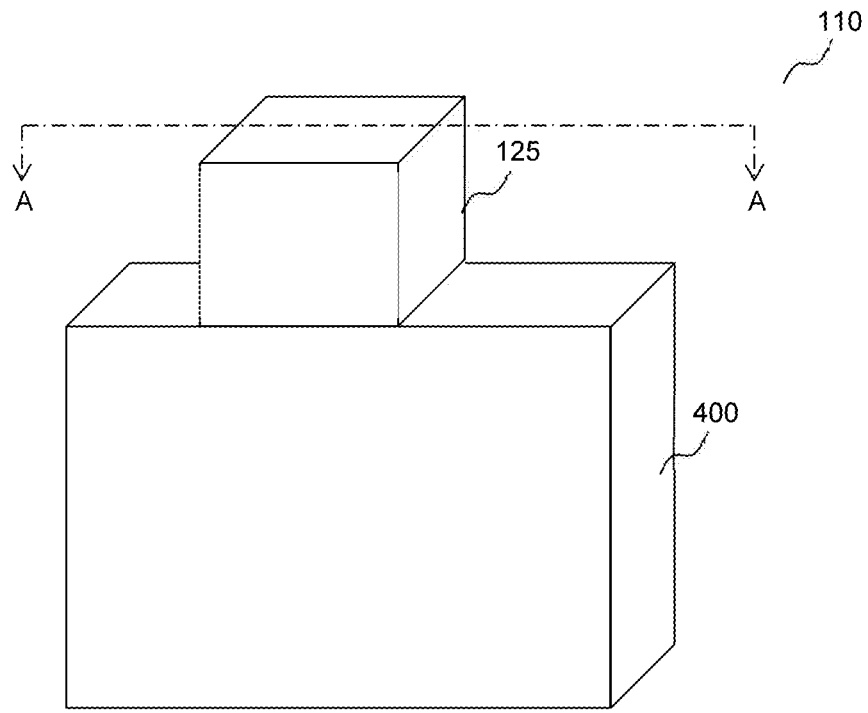
FIG. 4.1
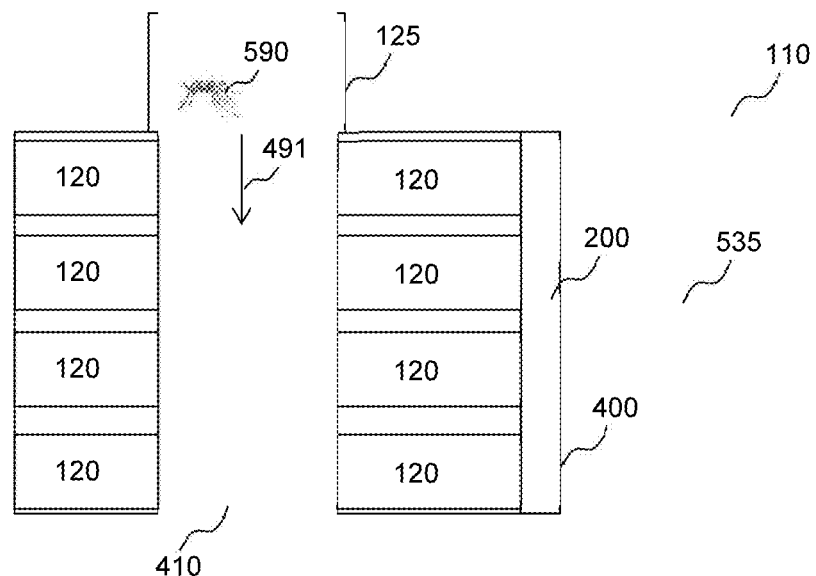
FIG. 4.2

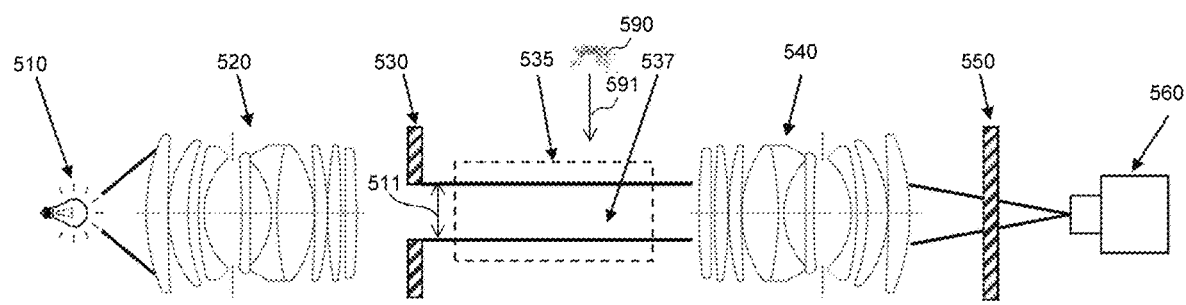
FIG. 5.1
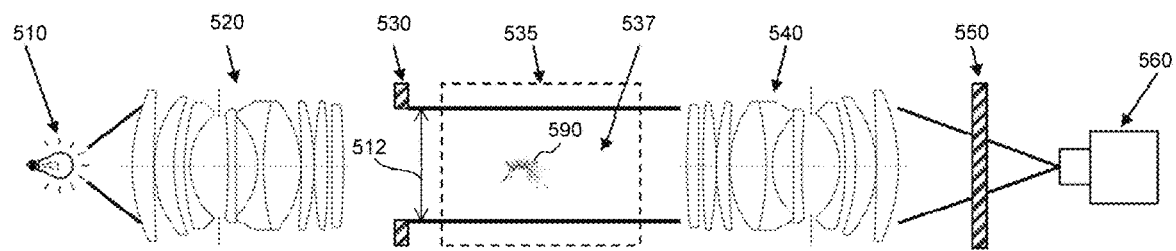
FIG. 5.2

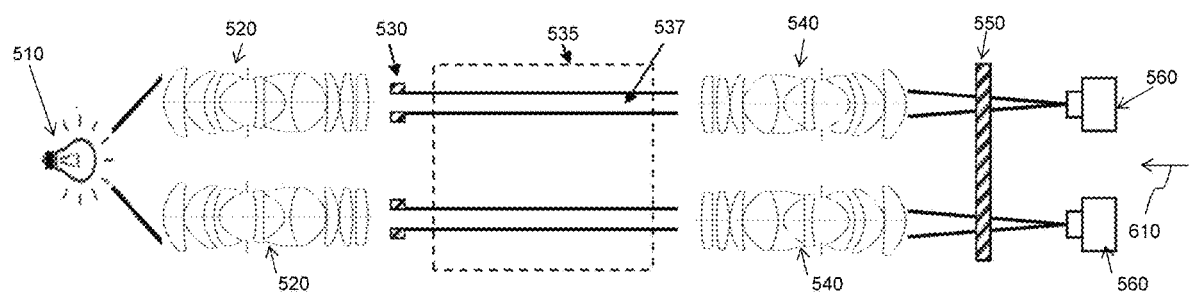
FIG. 6.1
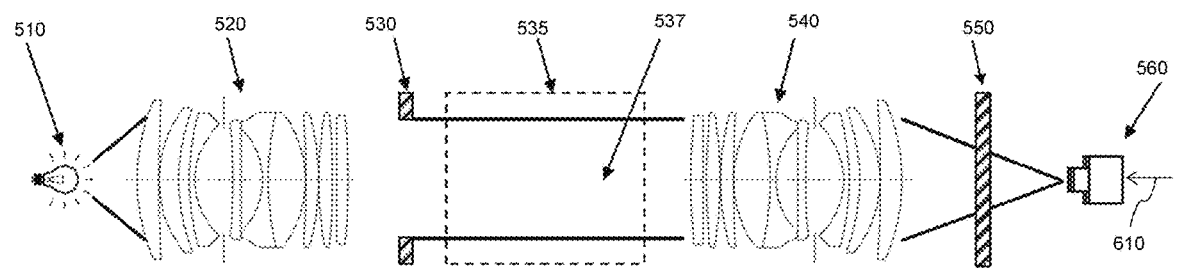
FIG. 6.2

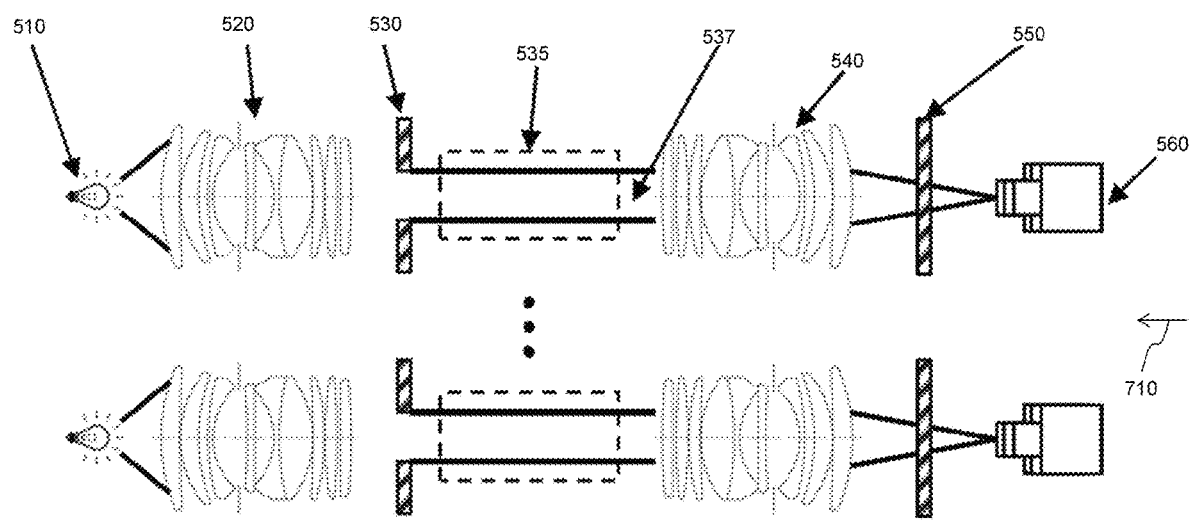
FIG. 7.1

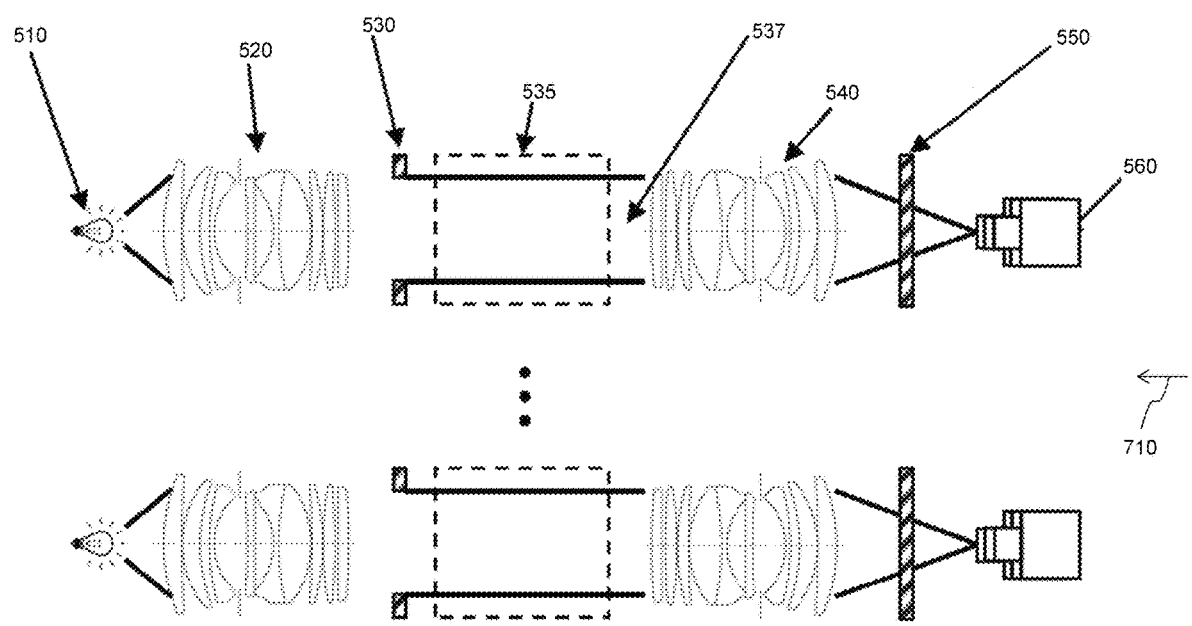
FIG. 7.2

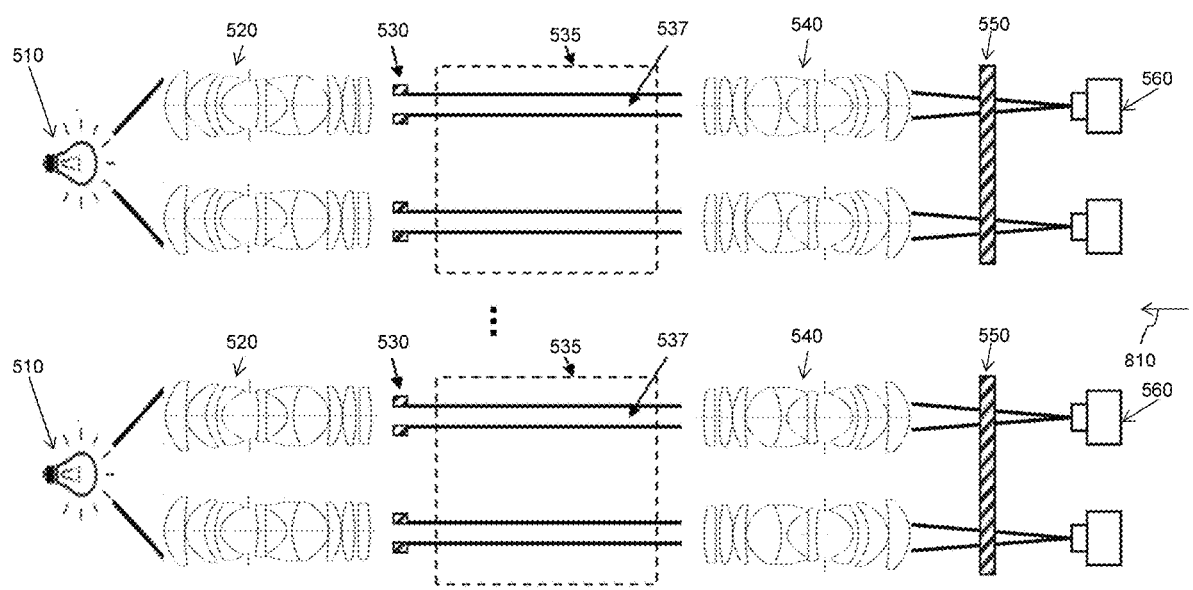
FIG. 8.1

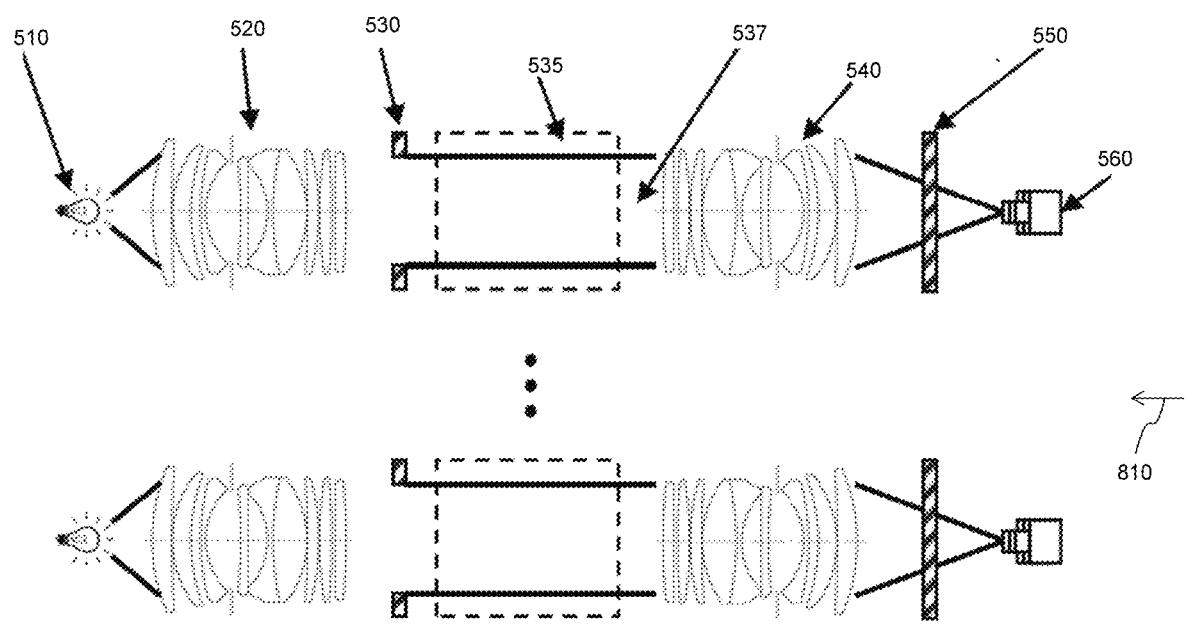
FIG. 8.2

SMART INSECT COLLECTION DEVICE

CROSS-REFERENCE TO RELATED APPLICATION

This application is a continuation-in-part of U.S. application Ser. No. 17/257,376, filed Dec. 31, 2020, which is a 371 of International Patent Application No. PCT/SG2019/050331, and claims the benefit of Singapore Application No. 10201805751U, filed Jul. 3, 2018, the contents of which are incorporated herein by reference in their entirety.

TECHNICAL FIELD

This invention relates to a smart insect collection device for trapping, identifying, and collecting insects. More particularly, this invention relates to a smart insect collection device for collecting insects into a plurality of collection containers over a period of time.

BACKGROUND

According to the World Health Organization, vector-borne diseases account for 17% of the estimated global burden of all infectious diseases. Malaria is the most prevalent mosquito-borne disease that affects more than 270 million people and causes more than 250 thousand deaths each year.

One way to curb the spread of Malaria lies in understanding population dynamics and biting characteristics of each mosquito vector species to facilitate planning of appropriate vector avoidance and control strategies. This requires extensive on-site surveillance that provides for accurate identification of mosquito vector species, estimation of mosquito vector population sizes, and knowledge of peak biting time of the mosquito vectors.

Current surveillance methods of mosquito vector species like the *Anopheles* spp., require overnight collection that often involve humans or animals as bait. While surveillance methods such as human-baited net traps HBNT and human bare leg catch HBLC can provide hourly data of *Anopheles* activities including biting times, these methods are both labor intensive and exposes human investigators to infection risks. Furthermore, the scale of such an effort is challenging, due to the number of insects and species and geographical spread that needs to be monitored. Furthermore, there are more than 30 different disease-carrying mosquito species, each with varying geographical distributions, migration trends, and biting patterns. Being able to monitor and track mosquitoes or insects to get a statistically accurate picture of their interaction with humans is so far out of reach. Most of the monitoring systems rely heavily on human vision and assessment.

Alternative surveillance methods such as the CDC light-trap which uses visual and/or olfactory cues to catch mosquitoes preclude use of humans or animals as baits. Although less labor intensive, the CDC light-trap is unable to obtain information regarding the biting activities of mosquitoes. Further, most mosquitoes caught using such traps are often damaged which makes it difficult for accurate identification.

Therefore, those skilled in the art are striving to provide an improved system and method of detecting and identifying the types of insects, as well as collecting them.

SUMMARY

According to a first aspect, there is provided a smart insect collection device comprising: a trapping device provided with a lure to attract insects into the trapping device; a sensing device having a through opening provided in fluid connection with the trapping device, the sensing device comprising: an optical source configured to emit an optical beam; a first lens group configured to collimate the optical beam to form a beam width between 10-120 mm and a beam height within 5 to 10 times a size of a target insect; a second lens group configured to collect the optical beam from the first lens group and arranged apart from the first lens group defining a sensing zone within the through opening; an optical detector configured to receive the beam from the second lens group and translate the beam to electrical signals; a processing unit configured to switch on the optical source and receive the electrical signals from the optical detector; and a collecting module comprising: a selection plate having at least one through hole wherein each through hole is configured to engage an opening of a collection container for collection of insects therein, the sensing device provided between the trapping device and the selection plate, the selection plate movable between a plurality of positions including at least one non-collecting position where no collection container is in fluid communication with the through opening of the sensing device and at least one collecting position where the through opening of the sensing device is in fluid communication with a collection container; and a controller in communication with the processing unit and with a motor provided to move the selection plate between the at least one non-collecting position and the at least one collecting position, the controller programmable to activate the motor to move the selection plate to the at least one collecting position in response to the processing unit identifying an insect passing through the through opening to be an insect of a predetermined kind for collection.

The electrical signals from the processing unit may be used to identify at least one of: a type, a species, a subspecies, and a sex of the insect in order to determine if the insect passing through the sensing device is an insect of a predetermined kind for collection.

The selection plate may comprise a plurality of through holes and may be selectably movable to any one of a corresponding plurality of collecting positions according to identification by the processing unit of at least one of: a predetermined type, a predetermined species, a predetermined subspecies and a predetermined sex of the insect.

The controller may be further programmable to activate the motor to move the selection plate between the plurality of positions in accordance with a predetermined schedule.

The smart insect collection device may further include a capacity sensor provided to detect a volume of insects collected in the collection container.

The controller may be further programmable to activate the motor to move the selection plate from a first collecting position to a second collecting position upon the capacity sensor detecting that a volume of insects in the collection container at the first collecting position has reached a predetermined level.

The trapping device may include a CDC miniature light-trap.

The smart insect collection device may include a plurality of legs for positioning the smart insect collection device at an elevated height.

The collection module may include a funnel provided between the sensing device and the selection plate.

The smart insect collection device may include a fan provided in the trapping device to drive insects in the trapping device towards the sensing device.

The smart insect collection device may include a fan provided at a bottom of each collection container to draw insects in the through opening of the sensing device towards the collection container when the collection container is in fluid communication with the through opening.

The controller may include memory for storing instructions to activate the motor for moving the selection plate.

The smart insect collection device may further include a support plate provided between the sensing device and the selection plate, the support plate having a through hole in fluid communication with the through opening of the sensing device, wherein the sensing device and the controller are supported on an upper surface of the support plate, and wherein the selection plate is movably attached to a lower surface of the support plate.

BRIEF DESCRIPTION OF THE DRAWINGS

In order that the invention may be fully understood and readily put into practical effect there shall now be described by way of non-limiting example only exemplary embodiments of the present invention, the description being with reference to the accompanying illustrative drawings.

FIG. 4.1 shows a perspective view of the sensing node.

FIG. 4.2 shows a cross sectional view of the sensing node.

FIG. 5.1 shows a front side view of a first embodiment of the sensing device.

FIG. 5.2 shows a top side view of the first embodiment of the sensing device.

FIG. 6.1 shows a front side view of a second embodiment of the sensing device.

FIG. 6.2 shows a top side view of the second embodiment of the sensing device.

FIG. 7.1 shows a front side view of a third embodiment of the sensing device.

FIG. 7.2 shows a top side view of the third embodiment of the sensing device.

FIG. 8.1 shows a front side view of a fourth embodiment of the sensing device.

FIG. 8.2 shows a top side view of the fourth embodiment of the sensing device.

DETAILED DESCRIPTION

Figure 1:
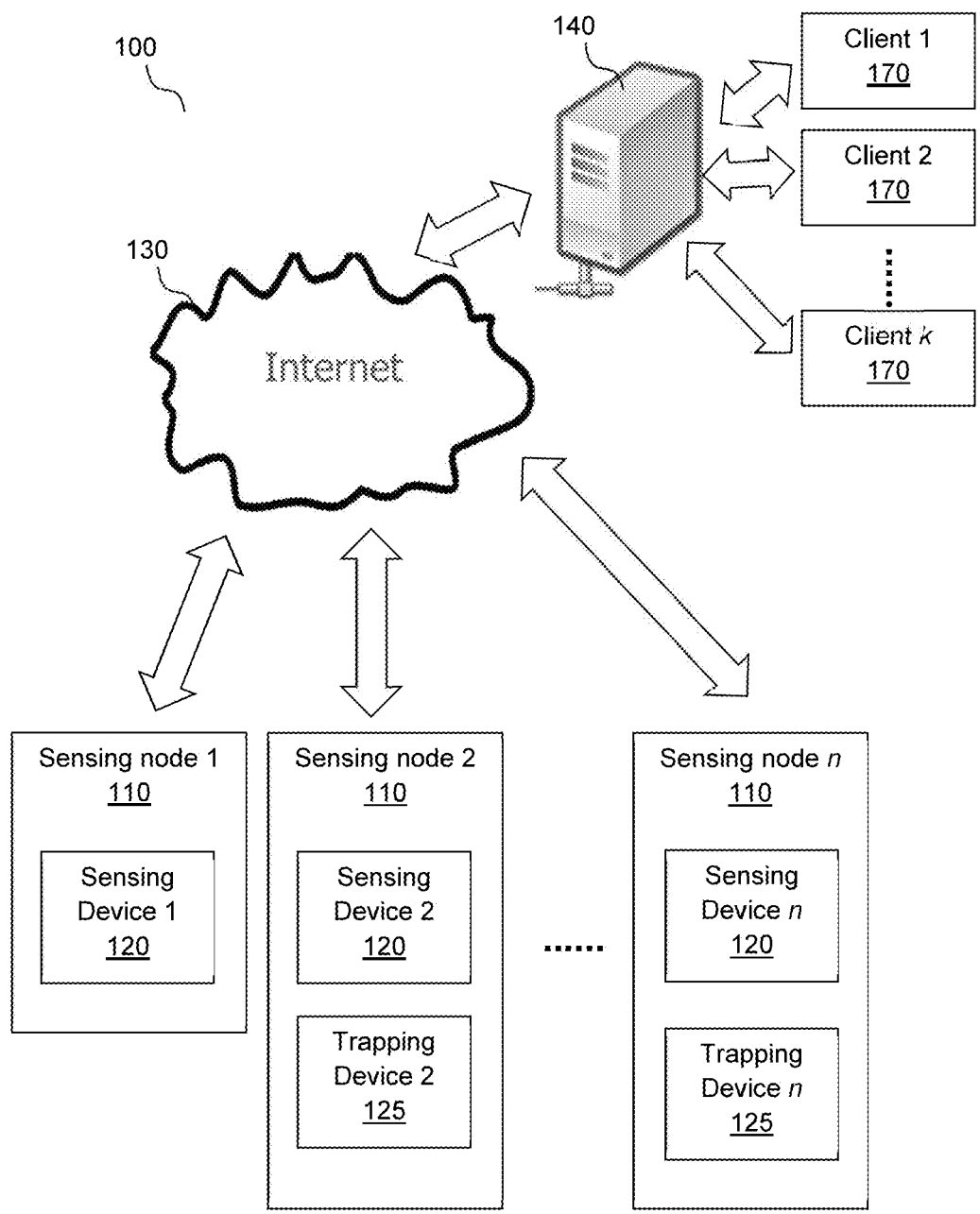
FIG. 1 shows an overview of an exemplary system for detecting and identifying insects from multiple locations.

Exemplary embodiment of a smart insect collection device 600 for trapping, identifying and collecting insects will be described with reference to FIGS. 1 to 17 in which the same reference numerals are used to refer to the same or similar parts.

Figure 13:
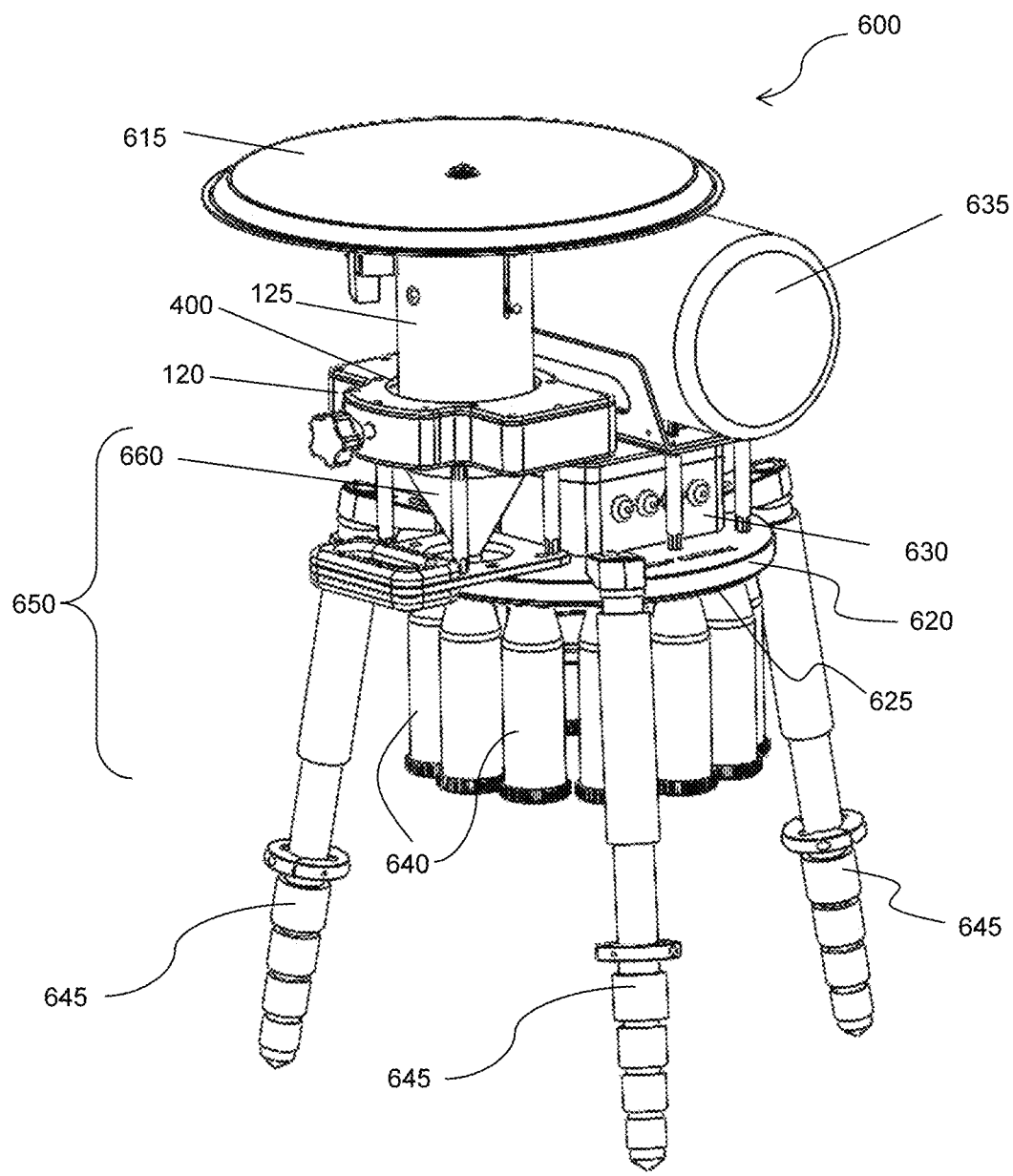
FIG. 13 shows a top perspective view of a first exemplary embodiment of a smart insect collection device.
Figure 14:
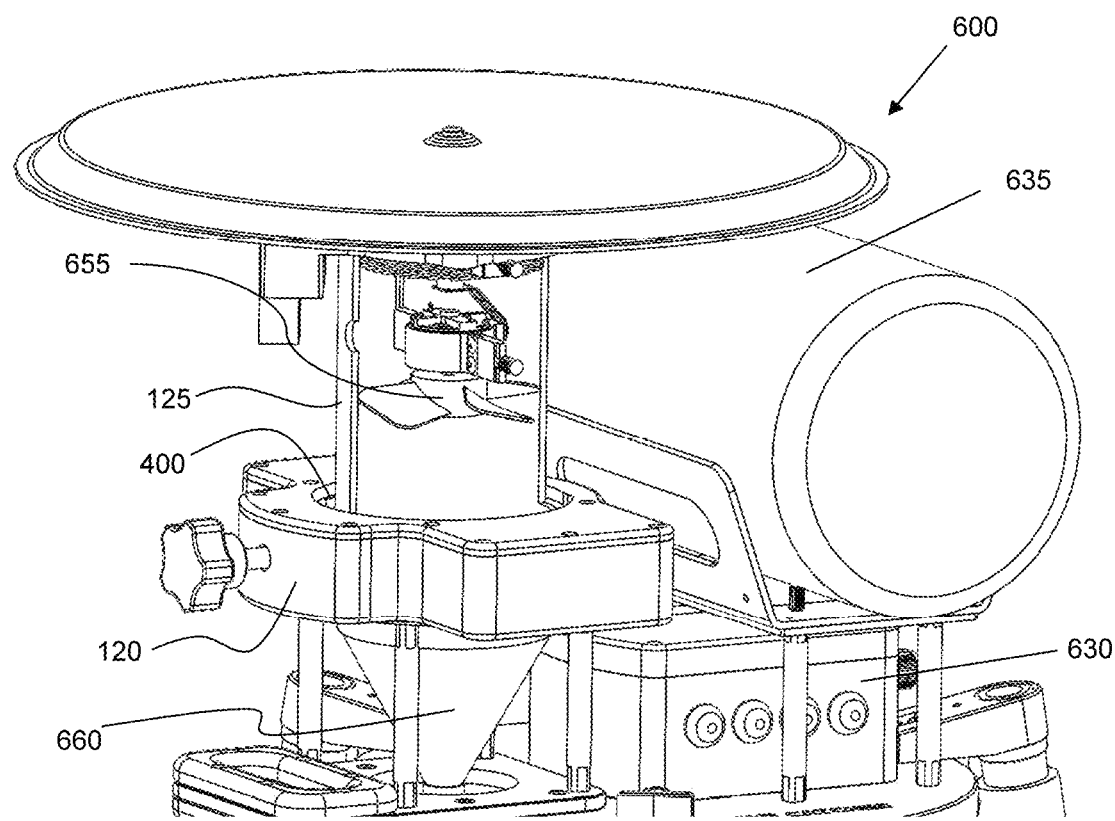
FIG. 14 shows an enlarged cutaway view of the trapping device in the smart insect collection device of FIG. 13.
Figure 15:
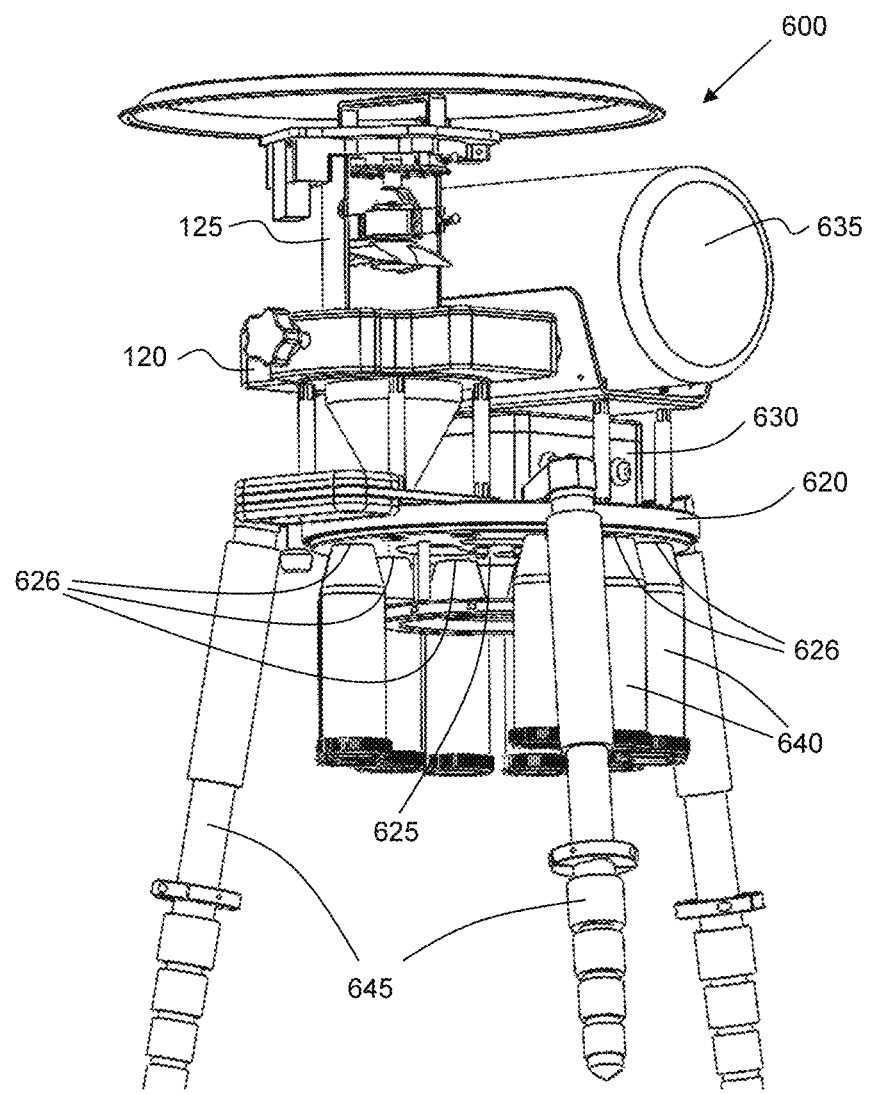
FIG. 15 shows a bottom perspective view of the smart insect collection device of FIG. 13.

FIGS. 13 to 15 show a first exemplary embodiment of a smart insect collection device 600. Generally, the collection device 600 comprises a trapping device 125, a sensing device 120, and a collecting module 650 comprising a selection plate 625, a controller 630 and at least one collection container 640.

The trapping device 125 is provided with a lure 635 to attract insects to the collection device 600. For instance, the lure 635 may be visual and/or olfactory attractants including light or carbon dioxide to attract insects. In a preferred embodiment, the lure 635 may comprise a liquid or gas collection container 635 that provides carbon dioxide dry air to the trapping device 125. Alternatively or additionally, the lure 635 may comprise light sources (not shown) that emit light of different wavelengths to attract different insects. A rain cover 615 may be provided on top of the trapping device 125 to prevent rainwater from entering the trapping device 125.

FIG. 14 shows a cutaway view of the trapping device 125 in the first exemplary embodiment of the smart insect collection device 600. The trapping device 125 is provided in fluid connection with a through opening 410 in the sensing device 120. Insects that enter the trapping device 125 may be directed towards the sensing device 120 by wind generated by at least one fan 655 provided in the trapping device 125.

FIG. 1 shows a sensing system 100 that comprises a number of sensing nodes 110 and a main server 140. Each sensing node 110 includes a sensing device 120 and a processing unit to allow the sensing node 110 to be communicatively connected to the main server 140 via the internet 130. Each sensing node 110 may also include a trapping device 125 605.

Information obtained by the processing unit of each sensing node 2-10 is transmitted to the main server 240 for final processing. The analysis results performed by the main server can then be downloaded by various clients 170 via devices such as tablets or mobile phones for viewing.

Each sensing node is required to acquire signals from detector of the sensing device 120 and deconstruct the signals to extract out the information such as the type of insect, size, sex and species. The deconstruction algorithm can be based on a Fourier transform, neural-network or wavelets where some form of pattern recognition algorithm can be applied to identify features in the signals. This algorithm can be implemented directly by the processing unit or transmitted to the main server to be centrally processed.

The main server 140 is a typical processing system such as desktop computer, laptop computer, or other computer terminal that is connected to internet 130 via either a wired or wireless connection to transmit information to and receive information from the processing unit of the sensing node 110. Main server 140 executes applications that perform the required processes in accordance with this disclosure. One skilled in the art will recognize that although only one main server 140 is shown, any number of servers may be connected and/or operating in parallel to perform the applications for providing embodiments of this disclosure without departing from this disclosure.

Processes are stored as instructions in a media that are executed by a processing system in main server 140 or a virtual machine running on the main server 140 to provide the method and/or system in accordance with this disclosure. The instructions may be stored as firmware, hardware, or software.

Figure 2:
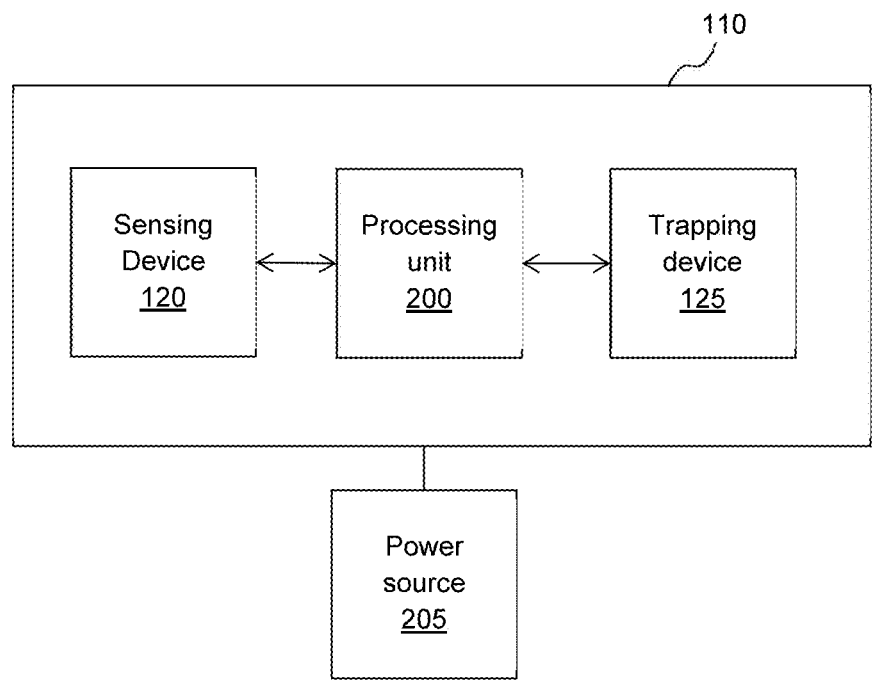
FIG. 2 shows a block diagram of a sensing node.

FIG. 2 illustrates the components of the sensing node 110. The sensing node 110 comprises a sensing device 120, a processing unit 200, a trapping device 125 605 as described in the preceding paragraphs, and a power source 205.

The sensing device 120 comprises an assembly of sensors installed in a manner that is triggered when an insect enters the sensing device 120. The sensing device 120 then captures the signature of signals generated by the flight of the insect and sends the information to the processing unit 200 which will in turn transmit the information to the main server 140. An application is provided on the processing unit of the main server 140 which includes an identification algorithm and a database of signatures unique to different species of insect such as mosquitoes. The signatures are also unique to the genders of each species of mosquitoes. The identification algorithm includes an artificial intelligence AI to identify the insect generating the signature of signals. Alternatively, the application including the identification algorithm and the database of signatures unique to different species of insect such as mosquitoes may be provided on the processing unit 200 of the sensing node 110.

Figure 3:
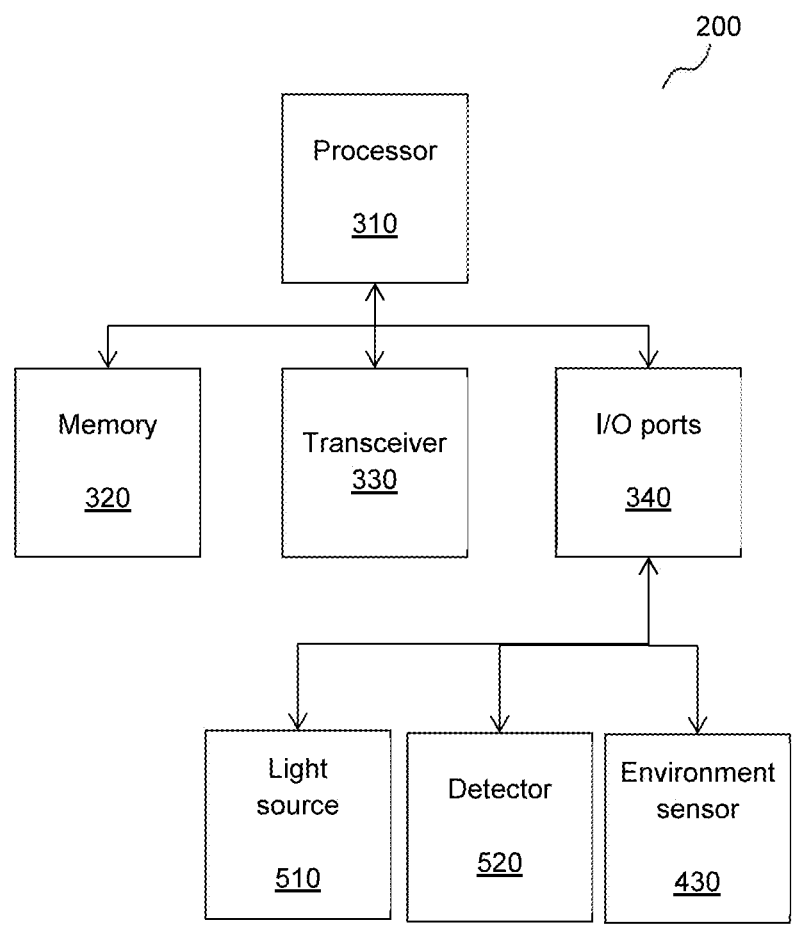
FIG. 3 shows a block diagram of circuitry provided to perform processes.

FIG. 3 illustrates the block diagram of the processing unit 200. The processing unit 200 can receive and transmit data, execute software applications. The processing unit 200 comprises a processor 310, memory 320, transceiver 330, and input/output ports 340.

The processor 310 is a processor, microprocessor, microcontroller, application specific integrated circuit, digital signal processor DSP, programmable logic circuit, or other data processing device that executes instructions to perform the processes in accordance with the present invention. The processor 310 has the capability to execute various applications that are stored in the memory 320.

The memory 320 may include read-only memory ROM, random-access memory RAM, electrically erasable programmable ROM EEPROM, flash cards, or any memory commonly used for computers. The memory 320 stores instructions which are executable by the processor 310 to perform processes in accordance with the method and system of this disclosure. The memory 320 has sufficient capacity where data can be stored on the processing unit when it cannot be sent out to the main server 140 or as backup until a user is able to manually download the information.

Transceiver 330 connects processor 310 to a network for transmission of data to and from other processing systems such as main server 140. Transceiver 330 has long range wireless communication capability such as 3G/4G/5G telecommunication network protocols and/or short and/or medium range wireless capability such as Wireless Fidelity Wi-Fi, Bluetooth, infrared, Zigbee, etc.

At least one input/output I/O ports 340 can be configured to allow the processor 310 to communicate with and control from various I/O devices. Peripheral devices that may be connected to processing unit 200 via the I/O ports 340 include the sensing device 120, a display, keypad, a USB storage device, an SD card or other storage device for transmitting information to or receiving information from the processing unit 200. In addition to updating applications stored on memory 320 or installing new applications onto the memory via the network device 330, a user may alternatively install new applications or update applications on the memory 320 through a user interface such as a USB via the I/O ports 340. Additional environment sensors 430 can be incorporated such as temperature and humidity sensors which data can be similarly stored or transmitted to the main server 140. Each of the individual devices such as sensing device 120, environment sensors 430 are identified and data time-logged.

The processing unit 200 is powered by the power source 205. Power source 205 may be battery operated or direct feed from the power grid. An external energy charging source can be incorporated such as a solar panel to extend the operational time of the sensing node 110. This is necessary for deployments in far locations where it is not possible to have routine inspections or maintenance and where it is not possible to draw power from the power grid.

One skilled in the art will recognize that other features may be included in the processing unit 200. Further, the components in processing unit 200 may be replaced by other components that perform similar functions. In brief, the processing unit 200 as shown in FIG. 3 is considered merely illustrative and non-limiting.

In order to reduce the cost of having to furnish each transceiver 330 with 3G/4G communication capability, the transceiver 330 may be equipped with short and/or medium range wireless capability and wirelessly connects to a sub-server. The sub-server would subsequently transmit the information to the main server 140. Essentially, the sub-server reduces the cost of having to furnish each processing unit 200 with 3G/4G communication capability. If future network communication protocol includes Internet of Things IoT communication at a more cost efficient rate, the processing unit 200 may be configured to transmit the information directly to the main server 140. In one embodiment, the transceiver 330 enables real-time upload of data to the main server 140 for further processing.

The sensing device 120 comprises an assembly of sensors to detect an insect entering the sensing node 110. The assembly of sensors capture a signature of signals generated by the flight of the insect. The signatures are collected by the processing unit 200. The assembly of sensors are arranged in a manner that is able to capture a signature that accurately count the number of mosquitoes, as well as determine the species and gender of the mosquito, when the mosquitoes enter the sensing node 110.

As it is not possible to predict when an insect flies through the sensing device 120, the sensing device 120 has to be in an "always-on" state. At the same time, the detection mechanism has to consume minimal power. Hence, the sensing device 120 uses an optical detector as it balances between low power, high accuracy and always operational. This involves at least one optical sources constantly emitting a beam to cover the desired area to monitor. At least one detector is located at the opposite end to pick up the optical signals. This detector can be a single pixel or array detector. As an insect flies through the optical beam, the signal is modulated by the insect and the modulated beam is picked up by the detector.

FIG. 4.1 shows a perspective view of a housing 400 of the sensing node 110 and FIG. 4.2 shows a cross sectional view along A-A of the housing 400. The sensing node 110 includes sensing device 120s 120 arranged within the housing 400 and a processing unit 200 at one side of the housing 400. The housing 400 has a through opening 410 that allows the insect 590 to fly through as shown by arrow 491. The trapping device 125 is provided in fluid communication with the through opening 410 for drawing insects to fly through the through opening 410. While FIG. 4.2 shows four sensing device 120s 120 arranged one on top of the other, it will be apparent from the description below that other arrangement of the sensing device 120s 120 may be implemented without departing from the present disclosure.

The processing unit 200 is provided along a side wall on the right side of the housing for more efficient arrangement of the communication lines between the processing unit 200 and sensing device 120s 120. One skilled in the art will recognise that the arrangement as shown in FIG. 4.2 is only one possible arrangement of the processing unit 200. Other arrangements such as along the side wall on the left side of the housing 400, front wall of the housing 400 or rear wall of the housing 400 may be implemented without departing from the disclosure.

FIG. 5.1 shows a front side view of the sensing device 120 and FIG. 5.2 shows the top side view of the sensing device 120. The sensing device 120 comprises an optical source 510, a first lens group 520, iris 530, a second lens group 540, an optical filter 550 and an optical detector 560. The optical source 510 and optical detector 560 are arranged on opposite ends. The first lens group 520 and second lens group 540 are arranged between the optical source 510 and optical detector 560 and defining a sensing zone 535. The iris 530 is arranged between the first lens group 520 and the entrance of the sensing zone 535. The optical filter 550 is arranged between the second lens group 540 and the optical detector 560.

The optical source 510 may be a laser emitter, such as a laser diode, emitting laser beam; infrared emitter emitting infrared beam; or any light emitter such as Light Emitting Diode LED. The optical source 510 is essentially a light emitter modulated with an external phase plate or an external shutter and operating at Visible Near Infra-Red VIS-NIR wavelengths.

The first lens group 520 is arranged after the optical source 510 to collimate the outgoing beam and to spread the coverage of the outgoing beam as large as possible while not compromising on the resultant output signal strength. A collimated beam is needed to pick up high frequency but low attenuation signals from the insects which would otherwise not be detected. The exact arrangement and configuration of the lens in the first lens group 520 are omitted for brevity as this is well known in the art. More importantly, the first lens group 520 has to receive and collimate the light from the optical source such that the first lens group 520 projects out an outgoing optical beam with a beam width 512 of a first predetermined range and a beam height 511 of a second predetermined range. Particularly, the beam width 512 is between 10-120 mm and the beam height 511 is less than 10 times the size of the insect to be detected in order to maximize the high frequency perturbations. Preferably, the beam height 511 is less than 50 mm for determining mosquitoes or within 5 to 10 times the size of the insect to be detected. It should also be noted that the first lens group 520 must be configured bearing in mind the type of the optical source 510 that will be used. This is because different types of optical source 510 may emit different characteristic of light source. Hence, a change in the choice of optical source 510 would likely require a reconfiguration of the first lens group 520 in order to achieve an outgoing optical beam with a beam width 512 of a first predetermined range and a beam height 511 of a second predetermined range. The first lens group 520 may include a prism or mirror to fold the optics, resulting in the more compact form factor.

The optical filter 550 is arranged after the first lens group 520 and serves to filter out external sources from the environment. The iris 530 serves to allow only the uniform optical beam from the first lens group 520 to pass through.

The second lens group 540 is arranged before the optical detector 560 to collect the emitted optical signal from the first lens group 520. This second lens group 540 may also include at least one prism or mirror to fold the optics, to reduce the size of the overall optics. In short, the second lens group 540 is arranged apart from the first lens group defining a sensing zone 535 and configured to collect the optical beam from the first lens group 520. All lenses in the first and second lens group 520 and 540 may be made using plastic through injection moulding or using glass or wafer-level optics. The collimated beam configuration would allow the modulation by the insect to have the consistent signal strength throughout the optical path. Without which, the intensity modulations would vary depending on where the insect passes through the optical path.

The optical beam can be modulated at the optical source or pass through a phase plate or a shutter to introduce known perturbations into the beam which is then deconstructed after detection.

The optical detector 560 is a device that converts the visible light into electrical signal. In order to maximize the efficiency of the optical detector 560, the optical detector 560 needs to be able to operate at about less than 10 KHz response time. The lower operating frequency of the optical detector 560 serves to attenuate high frequency signals from possible external influences like the environment. It is possible for a single optical detector 560 to cover 10 mm to 120 mm beam width, thus lowering power consumption and cost of implementation.

As shown in FIG. 5.1, an insect 590 will fly through the sensing zone 535 which is defined within the through opening 410, in the direction shown by arrow 591 thereby passing through optical beams 537. This allows the system to detect the insect flying through the sensing zone 535 and the type of insect based on the beam received by the optical detector 560. When the insect passes through the sensing zone 535, the beam is modulated by the insect which in turn is a beam signature that is unique to the insect. In short, the modulated beam is essentially a signature of the insect.

It should also be noted that the optical source 510, first lens group 520, second lens group 540, and optical detectors 560 will be enclosed along the length of the pathway of the optical beam 537 such that optical beam 537 will only be able to leave and enter through a restricted passage. This ensures that stray light is prevented from entering the optical source 510, first lens group 520, second lens group 540, and optical detectors 560. While FIGS. 5.1 and 5.2 do not show housings or enclosures covering the optical source 510, first lens group 520, second lens group 540, and optical detectors 560, one skilled in the art will recognise that the housings or enclosures are provided along the length of the pathway of the optical beam except the sensing zone 535.

FIGS. 6.1, 6.2, 7.1, 7.2, 8.1, and 8.2 show different embodiments of the configuration and arrangement of the sensing device 120.

Figure 9A:
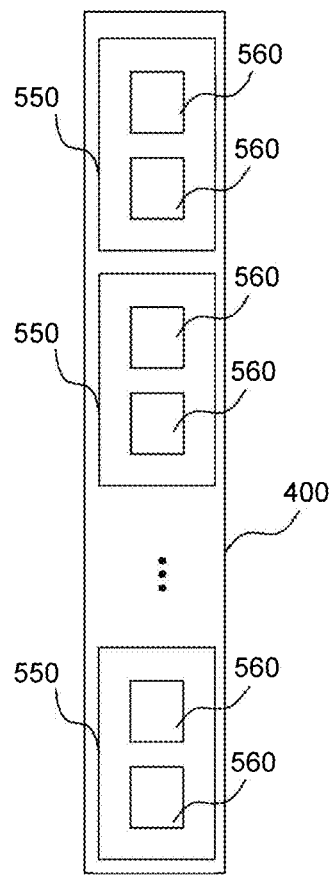
FIG. 9A shows a right side view of the second embodiment of the sensing device.
Figure 9B:
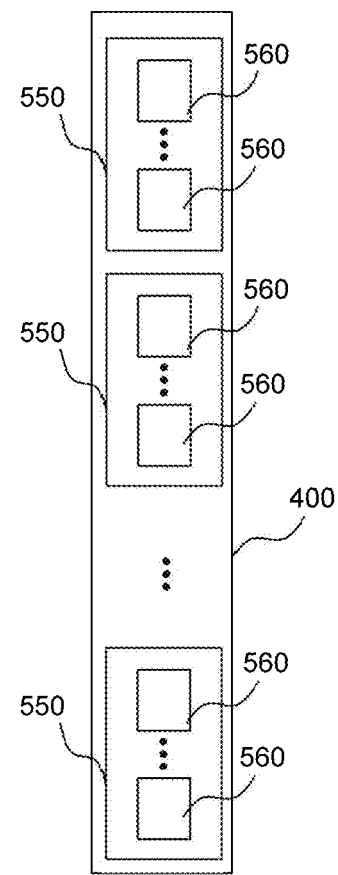
FIG. 9B shows a right side view of an alternative of the second embodiment of the sensing device.

FIG. 6.1 shows a front side view of the sensing device 120 having a pair of first lens group 520, second lens group 540 and optical detectors 560 and FIG. 6.2 shows the top side view of the sensing device 120. In this configuration, the pair of first lens group 520, second lens group 540 and optical detectors 560 is arranged one on top of the other such that the pair of first lens group 520 produces two sets of optical beams 537 and the optical detectors 560 receives the two sets of optical beams 537 via the pair of second lens group 540. Further, while the pair of first lens group 520 is shown as separate pieces, one skilled in the art will recognise that the pair of first lens group 520 may be provided as a single piece first lens group 520 without departing from the disclosure. Like the pair of first lens group 520, the pair of second lens group 540 may be provided as a single piece second lens group 540 without departing from the disclosure. The optical source 510, each of the first lens group 520, each of the second lens group 540, and each of the optical detectors 560 will be enclosed along the length of the pathway of the optical beam such that optical beam will only be able to leave and enter through a restricted passage. This ensures that stray light is prevented from entering the optical source 510, each of the first lens group 520, each of the second lens group 540, and each of the optical detectors 560. While FIGS. 6.1 and 6.2 do not show housings or enclosures covering the optical source 510, each of the first lens group 520, each of the second lens group 540, and each of the optical detectors 560, one skilled in the art will recognise that the housings or enclosures are provided along the length of the pathway of the optical beam except the sensing zone 535. Advantageously, in this configuration, one optical source 510, iris 530 and optical filter 550 is required, reducing the cost of materials. Furthermore, in this configuration, insects flying through will thereby pass through two sets of optical beams 537. This allows the system to identify the flight direction of the insects and also collect more information from two sets of beams for a single insect. For example, this allows a user to determine whether the insect is flying from the top to bottom of the through opening 410 or bottom to top of the through opening 410. FIG. 9A shows the configuration of the optical detector 560 and the optical filter 550 when viewed from the direction of the arrow 610. As shown in FIG. 9A, a number of sensing device 120s 120 are arranged one on top of the other within the housing 400 where each sensing device 120 comprises a pair of first lens group 520, second lens group 540 and optical detectors 560. An alternative arrangement is shown in FIG. 9B where more than 2 first lens group 520, second lens group 540 and optical detectors 560 may be provided in one sensing device 120.

Figure 10:
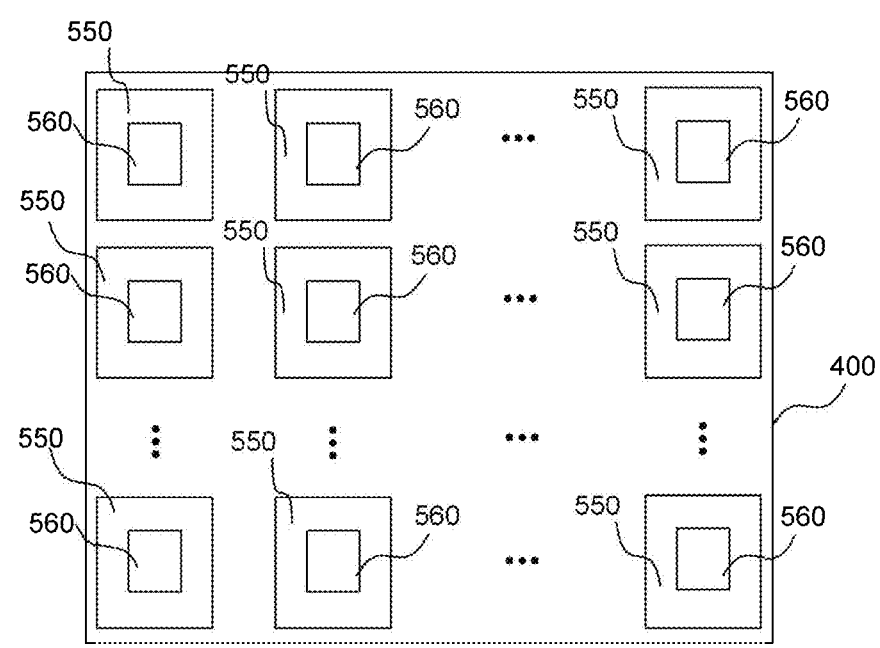
FIG. 10 shows a right side view of the third embodiment of the sensing device.

FIG. 7.1 shows a front side view of a number of sensing device 120s 120 cascaded in the vertical direction and FIG. 7.2 shows the top side view of a number of sensing device 120s 120 cascaded in the horizontal direction forming a two-dimensional array. In this configuration, the insect flies through multiple optical beams and is applicable for situations where the flight paths of the insects need to be monitored. FIG. 10 shows the configuration of the optical detector 560 and the optical filter 550 when viewed from the direction of the arrow 710.

Figure 11A:
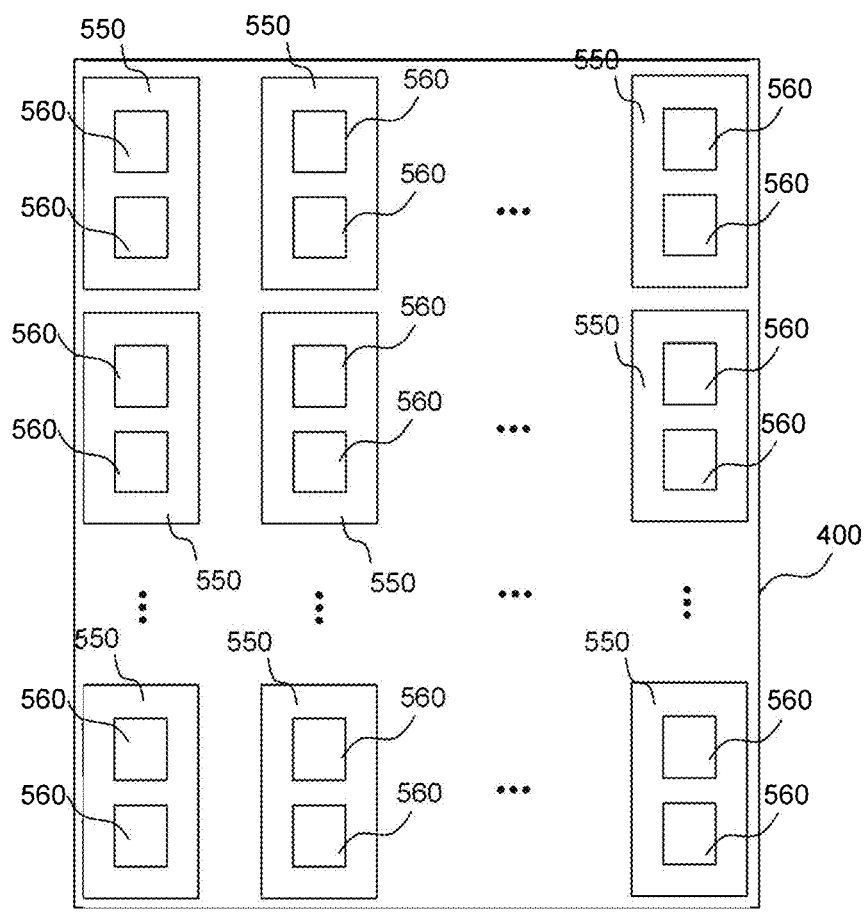
FIG. 11A shows a right side view of the fourth embodiment of the sensing device.
Figure 11B:
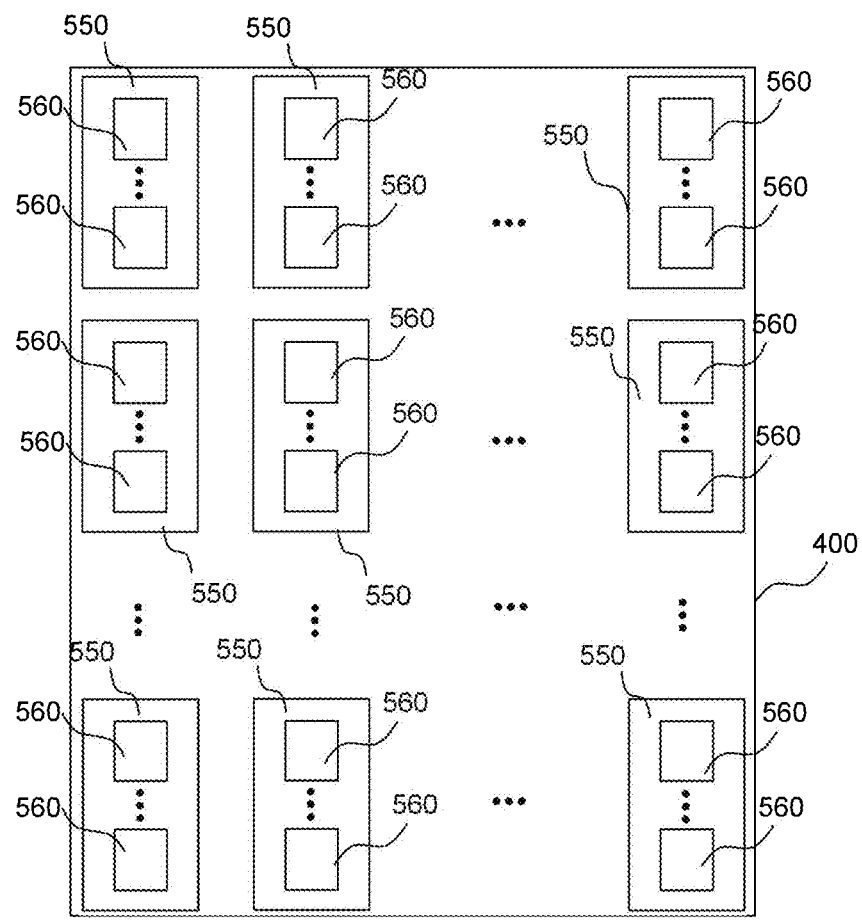
FIG. 11B shows a right side view of an alternative of the fourth embodiment of the sensing device.

FIG. 8.1 shows a front side view of a number of sensing device 120s 120, each sensing device 120 in the same configuration as shown in FIG. 6.1 which is cascaded in the vertical direction and FIG. 8.2 shows the top side view of a number of sensing device 120s 120 cascaded in the horizontal direction forming a two-dimensional array. In this configuration, the insects can be monitored over a larger area. A structural wall separating the individual optical beams may or may not be needed in this configuration. FIG. 11A shows the configuration of the optical detector 560 and the optical filter 550 when viewed from the direction of the arrow 810. An alternative arrangement is shown in FIG. 11B where more than 2 first lens group 520, second lens group 540 and optical detectors 560 may be provided in one sensing device 120.

Figure 12:
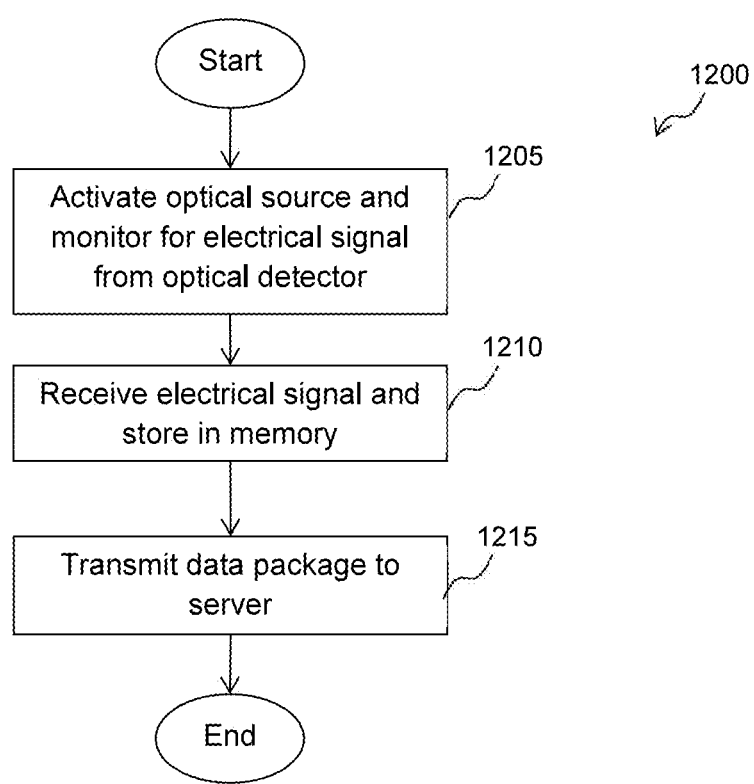
FIG. 12 shows a flow diagram of a process performed by the processor in a processing unit for detecting and identifying an insect.

FIG. 12 illustrates a flow diagram of process 1200 performed by the processor in processing unit 200 in accordance with an embodiment of this disclosure. Process 1200 begins with step 1205 to activate the optical source 510 and monitor for electrical signal received from the optical detector 560. Upon receiving an electrical signal, the electrical signal is stored in the memory together with a time stamp in step 1210. After a predetermined time, all the electrical signals with time stamps are transmitted to the server in at least one data packages in step 1215. The data packages may be transmitted directly to the server via the internet or via a mobile memory storage. Process 1200 ends after step 1215.

In all embodiments of the smart insect collection device 600, the through opening 401 of the sensing device 120 is provided in fluid connection with the collecting module 650 for collecting insects that pass through the sensing device 120. The sensing device 120 is provided between the trapping device 125 and the selection plate 625 of the collecting module 650. As can be seen in FIG. 15, the selection plate 625 is provided with at least one through hole 626 wherein each through hole 626 is configured to detachably engage an opening of a collection container 640 for collection of insects therein. For instance, an outer periphery of the opening of the collection container 640 may comprise screw threads that enable the collection container 640 to be engage corresponding screw threads provided on an inner periphery of the through holes 626 in the selection plate 625. In another embodiment, a collection container 640 may be snap-fitted into a through hole 626 in the selection plate 625.

In all embodiments, a first surface of the selection plate 625 faces the sensing device 120 while the collection container 640 engages the through hole 626 at a second surface of the selection plate 625. In the exemplary embodiments shown in FIGS. 13 to 17, the collection containers 640 are attached to a lower surface of the selection plate 625 while the sensing device 120 is provided above an upper surface of the selection plate 625.

In all embodiments, the selection plate 625 is movable between a plurality of positions including at least one non-collecting position where no collection container is in fluid communication with the through opening 401 of the sensing device 120 and at least one collecting position where the through opening 401 of the sensing device 120 is in fluid communication with a collection container 640. In the at least one non-collecting position, fluid communication from the trapping device 125 through the sensing device 120 terminates at a solid portion of the selection plate 625, such that any insect within the trapping device 125 or sensing device 120 may not pass into any collection container 640. A motor (not shown) is provided in communication with the controller 630 to move the selection plate 625 between the plurality of positions. The controller 630 may comprise a microprocessor that executes programmable instructions that are stored in an embedded non-transitory memory for controlling the motor to move the selection plate 625.

In the embodiments as shown in FIGS. 13 to 17, the selection plate 625 has a plurality of through holes 626, preferably eight to twelve through holes 626, that are provided in a circular arrangement on the selection plate 625. The selection plate 625 is rotatable about an axis that is perpendicular to the plane the selection plate 625 and that passes through the centre of the circular arrangement of the plurality of through holes 626. In this way, the controller 630 can move the selection plate 625 between the plurality of positions by rotating the selection plate 625 either in a clockwise or an anti-clockwise direction.

In other embodiments (not shown), the plurality of through holes 626 in the selection plate 625 may be provided along a straight line in the selection plate 625. In this way, the selection plate 625 is moved between the plurality of positions by linearly moving the selection plate 625 relative to the sensing portion 120.

In the first exemplary embodiment as shown in FIGS. 13 to 15, the sensing device 120 is supported on a first surface of a support plate 620. The through opening 401 of the sensing device 120 is provided in fluid communication with a through hole 621 provided in the support plate 620. The through hole 621 in the support plate 620 has a size corresponding to the at least one through hole 626 provided in the selection plate 625. In this embodiment, as the through opening 401 in the sensing device 120 is significantly larger than the through hole 621 in the support plate 620, the sensing device 120 may be spaced apart from the support plate 620 and a funnel 660 may be provided between the sensing device 120 and the through hole 621 in the support plate 620 to connect the larger through opening 401 with the smaller through hole 621 in the support plate 620 to channel an insect in the through opening 401 into the collection container 640.

Figure 16:
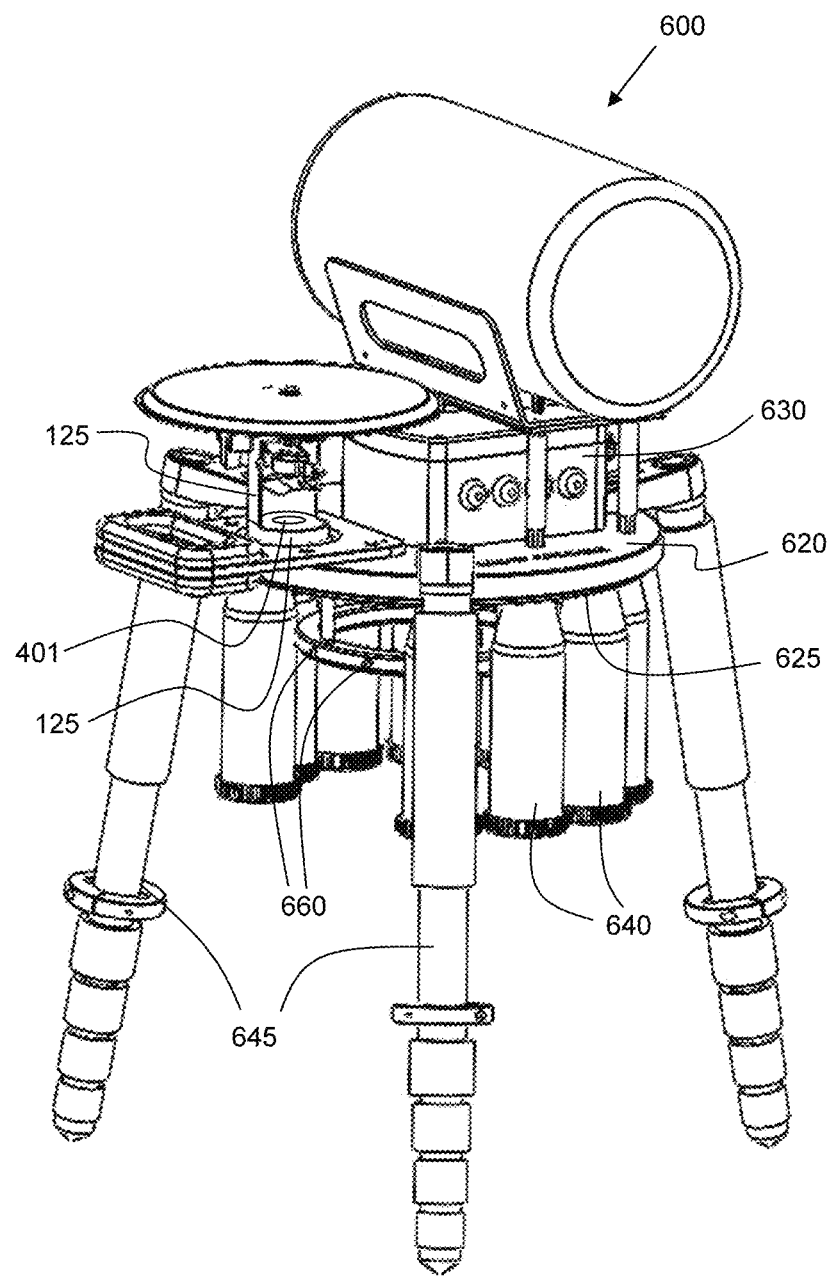
FIG. 16 shows an alternative exemplary embodiment of a smart insect collection device.

In an alternative embodiment as shown in FIG. 16 (where the trapping device 125 is shown in a cutaway view), the through opening 401 of the sensing device 120 corresponds to the size of the opening of the at least one collection container 640, and in this case the sensing device 120 may be provided directly on the support plate 620 without need for a funnel 660 to used.

In the exemplary embodiment shown in FIGS. 13 to 17, the support plate 620 is provided for supporting thereon the sensing device 120, the trapping device 125, the controller 630 and the lure 635. In these embodiments, a second surface of the support plate 620 may be movably coupled to a first surface of the selection plate 625. For example, a lower surface of the support plate 620 may be movably coupled to an upper surface of the selection plate 625.

In other embodiments (not shown), no support plate 620 may be provided. Instead, the selection plate 625 may be provided in movable contact with the sensing device 120 so that in a collecting position, the through opening 401 of the sensing device 120 opens directly into a through hole 626 of the selection plate 625, while in the non-collecting position, a solid portion of the selection plate 625 seals the through opening 410 of the sensing device 120.

In some embodiments, the controller 630 may be programmed to move the selection plate 625 between the plurality of positions in accordance with identification by the sensing device of an insect passing through the through opening to be an insect of a predetermined kind for collection. For example, the predetermined kind of insect for collection may be at least one of: a type, a species, a subspecies, and a sex of the insect. For instance, where the selection plate 625 has a plurality of through holes 626 to which a corresponding plurality of collection containers 640 are attached, the controller 630 may be programmed to move the selection plate 625 to a first collecting position upon the sensing device 120 detecting that an insect in the through opening 410 is an insect of a first predetermined type, species, subspecies or sex, to move the selection plate 625 to a non-collecting position upon the sensing device 120 detecting no insect in the through opening 410, and to move the selection plate 625 to a second collecting position upon the sensing device 120 detecting that an insect in the through opening 410 is an insect of a second predetermined type, species, subspecies or sex, and so on. In this manner, the smart insect collection device 600 can assist the user to sort the collected insects into different collection containers 640 according to their type, species, subspecies or sex, as may be desired.

In another embodiment, the controller 630 may be programmed to move the selection plate 625 between the plurality of positions in accordance with a predetermined schedule. For instance, the selection plate 625 may be moved from a non-collecting position to a collecting position at a predetermined collection time to begin collection of insects. A duration in which the selection plate 625 remains in each of the at least one collecting positions may be independently set so that each collection container 640 contains a number of insects collected in a specific time period. In this embodiment, if the plurality of holes 626 and collection containers 640 are provided in a circular arrangement on the selection plate 625, the selection plate 625 can alternate between the non-collecting positions and the collecting positions by a stepped rotation of the selection plate 625 in a single direction, whether clockwise or anticlockwise.

Figure 17:
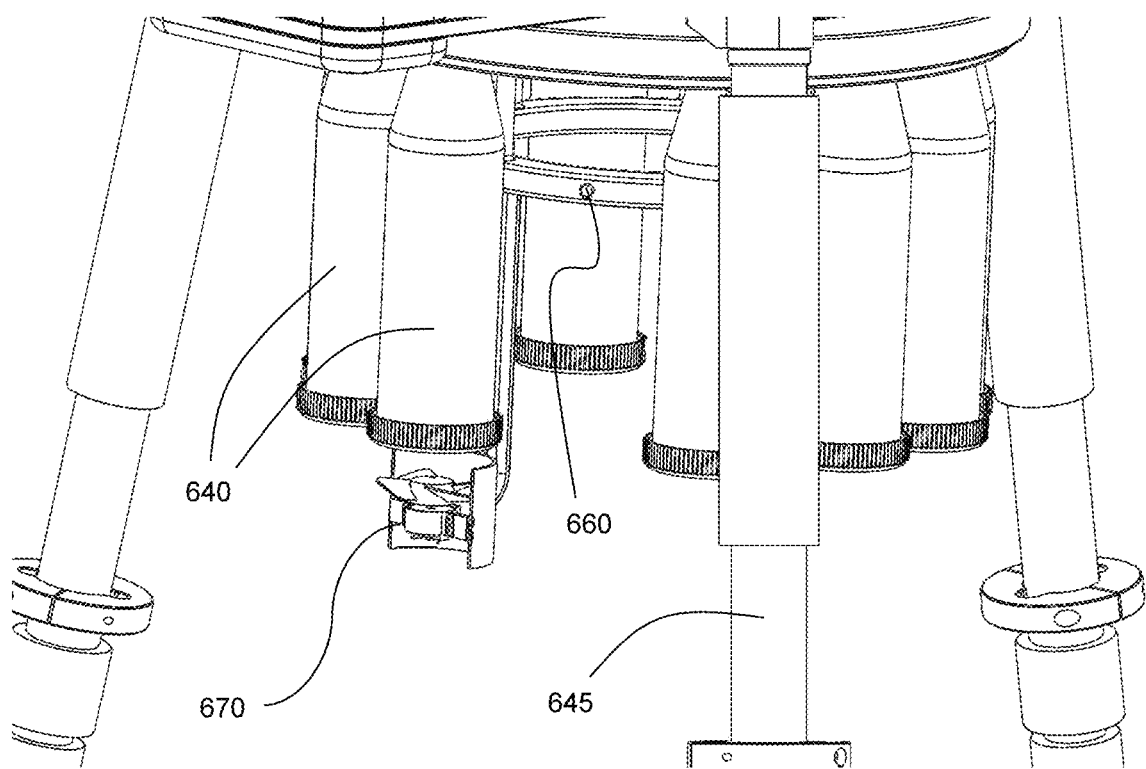
FIG. 17 shows a capacity sensor and a cutaway view of a fan provided at a bottom of a collection container in a further exemplary embodiment of a smart insect collection device.

In some embodiments there may also be a combination of triggers for the controller 630 to move the selection plate In an alternative embodiment of the smart insect collection device 600, a fan 670 may be provided at the bottom of each collection container 640 as shown in FIG. 17. In this way, an insect in the through opening 401 of the sensing device 120 will be drawn towards the collection container 640 when the collection container 640 is in fluid connection with the through opening 401.

In a preferred embodiment, the collection device 600 further comprises a plurality of legs 645 for elevating the collection device 600 at an elevated height, as shown in FIGS. 13 and 15-17. The plurality of legs 645 may be connected to the support plate 620. More preferably, each of the plurality of legs 645 is of adjustable length for varying the height of the collection device 600 or for positioning the collection device 600 on uneven ground. For instance, the plurality of legs 645 may have a telescopic structure.

In some embodiments, as shown in FIGS. 16 and 17, the smart insect collection device 600 may comprise a plurality of capacity sensors 660 in communication with the controller 630 for detecting and monitoring the collection volume of each of the plurality of collection containers 640. The capacity sensors 660 may be any of the following: optical sensors, micro-cameras or acoustic sensors, or a combination of any of such sensors. The capacity sensors 660 may be connected to the lower surface of the selection plate 625. For instance, the plurality of capacity sensors 660 may be provided on a ring suspended from the lower surface of the selection plate 625 to face the plurality of collection containers 640. The controller 630 may be configured to move the selection plate 620 between the plurality of positions upon detection of a volume of insects in a collection container 640 reaching a predetermined level. For instance, the controller 630 may be programmed to move the selection plate 625 from a first collecting position to a second collecting position upon the capacity sensor 660 detecting that the volume of insects in the collection container 540 at the first collecting position has reached a specific volume so that further insects will be collected in the collection container 640 at the second collecting position.

The smart insect collection device 600 may be battery powered for use in remote areas where no power supply is available. Alternatively, the smart insect collection device 600 may be powered by connection to a power grid.

Typical surveillance programs require monthly collection of insect vectors at multiple sampling points. Using the smart insect collection device 600, a two-man team is able to assemble and set up eight traps within two hours. As the controller 640 of the smart insect collection device 600 is programmable, the device 600 can be set up at any time of the day and activated at desired user-defined times. The smart insect collection device 600 allows movement of the selection plate 625 to be programmable by the user such that the device 600 may be activated by any of the following events: predetermined time interval or schedule, according to the sex and/or type of the insect detected by the sensor and identified by the processing unit, and predetermined volume level detected by the capacity sensor.

By precluding use of humans as bait, the smart insect collection device 600 lowers the risk of human infection. The smart insect collection device 600 may be set up in hazardous areas to carry out insect surveillance without exposing human beings to risks. Furthermore, the device 600 alleviates mundane and manual field-work, hence promoting morale, productivity and better work-life balance.

The above is a description of exemplary embodiments of a system and method of detecting identifying and collecting inserts remotely in accordance with this disclosure. It is foreseeable that those skilled in the art can and will design alternative systems based on this disclosure that infringe upon this invention as set forth in the following claims. For example, while the figures and description have disclosed a smart collection device 600 having a support plate 620 provided between the sensing device 120 and the selection plate 625.

The invention claimed is:

1. A smart insect collection device comprising:
    a trapping device provided with a lure to attract insects into the trapping device;
    a sensing device having a through opening provided in fluid connection with the trapping device, the sensing device comprising:
        an optical source configured to emit an optical beam;
        a first lens group configured to collimate the optical beam to form a beam width between 10-120 mm and a beam height within 5 to 10 times a size of a target insect;
        a second lens group configured to collect the optical beam from the first lens group and arranged apart from the first lens group defining a sensing zone within the through opening;
        an optical detector configured to receive the beam from the second lens group and translate the beam to electrical signals;
    a processing unit configured to switch on the optical source and receive the electrical signals from the optical detector; and
    a collecting module comprising:
        a selection plate having at least one through hole wherein each through hole is configured to engage an opening of a collection container for collection of insects therein, the sensing device provided between the trapping device and the selection plate, the selection plate movable between a plurality of positions including at least one non-collecting position where no collection container is in fluid communication with the through opening of the sensing device and at least one collecting position where the through opening of the sensing device is in fluid communication with a collection container; and
        a controller in communication with the processing unit and with a motor provided to move the selection plate between the at least one non-collecting position and the at least one collecting position, the controller programmable to activate the motor to move the selection plate to the at least one collecting position in response to the processing unit identifying an insect passing through the through opening to be an insect of a predetermined kind for collection.

2. The smart insect collection device according to claim 1, wherein the electrical signals from the processing unit are used to identify at least one of: a type, a species, a subspecies, and a sex of the insect in order to determine if the insect passing through the sensing device is an insect of a predetermined kind for collection.

3. The smart insect collection device according to claim 1, wherein the selection plate comprises a plurality of through holes and is selectably movable to any one of a corresponding plurality of collecting positions according to identification by the processing unit of at least one of: a predetermined type, a predetermined species, a predetermined subspecies and a predetermined sex of the insect.

4. The smart insect collection device according to claim 1, wherein the controller is further programmable to activate the motor to move the selection plate between the plurality of positions in accordance with a predetermined schedule.

5. The smart insect collection device according to claim 1, further comprising a capacity sensor provided to detect a volume of insects collected in the collection container.

6. The smart insect collection device according to claim 5, wherein the controller is further programmable to activate the motor to move the selection plate from a first collecting position to a second collecting position upon the capacity sensor detecting that a volume of insects in the collection container at the first collecting position has reached a predetermined level.

7. The smart insect collection device according to claim 1, wherein the trapping device comprises a CDC miniature light-trap.

8. The smart insect collection device according to claim 1, further comprising a plurality of legs for positioning the smart insect collection device at an elevated height.

9. The smart insect collection device according to claim 1, wherein the collection module comprises a funnel provided between the sensing device and the selection plate.

10. The smart insect collection device according to claim 1, further comprising a fan provided in the trapping device to drive insects in the trapping device towards the sensing device.

11. The smart insect collection device according to claim 1, further comprising a fan provided at a bottom of each collection container to draw insects in the through opening of the sensing device towards the collection container when the collection container is in fluid communication with the through opening.

12. The smart insect collection device according to claim 1, wherein the controller comprises memory for storing instructions to activate the motor for moving the selection plate.

13. The smart insect collection device according to claim 1, further comprising a support plate provided between the sensing device and the selection plate, the support plate having a through hole in fluid communication with the through opening of the sensing device, wherein the sensing device and the controller are supported on an upper surface of the support plate, and wherein the selection plate is movably attached to a lower surface of the support plate.

* * * * *